United States Patent
Uesaka et al.

(10) Patent No.: US 8,039,538 B2
(45) Date of Patent: Oct. 18, 2011

(54) RUBBER COMPOSITION FOR A TIRE AND TIRE HAVING A TREAD USING THE SAME

(75) Inventors: Kenichi Uesaka, Kobe (JP); Kazuo Hochi, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 360 days.

(21) Appl. No.: 11/586,696

(22) Filed: Oct. 26, 2006

(65) Prior Publication Data

US 2007/0129479 A1 Jun. 7, 2007

(30) Foreign Application Priority Data

Dec. 1, 2005 (JP) ................................ 2005-347894

(51) Int. Cl.
*B60C 1/00* (2006.01)
*C08F 8/34* (2006.01)
*C08K 3/36* (2006.01)

(52) U.S. Cl. ..... 524/493; 524/492; 524/575; 525/332.6; 152/905

(58) Field of Classification Search .................. 524/492, 524/493, 575; 525/332.6; 152/905
See application file for complete search history.

(56) References Cited

U.S. PATENT DOCUMENTS

| | | | |
|---|---|---|---|
| 4,421,899 A | 12/1983 | Yamazaki et al. | |
| 6,211,278 B1 | 4/2001 | Vanel | |
| 6,518,367 B1 * | 2/2003 | Yatsuyanagi et al. | 525/332.6 |
| 6,943,220 B2 * | 9/2005 | Matsunaga et al. | 525/331.7 |
| 7,351,761 B2 * | 4/2008 | Hochi | 524/442 |
| 2004/0102567 A1 | 5/2004 | Pennequin et al. | |

FOREIGN PATENT DOCUMENTS

| | | |
|---|---|---|
| CN | 1222538 A | 12/1983 |
| EP | 1 088 855 A1 | 4/2001 |
| EP | 1 245 623 A1 | 10/2002 |
| EP | 1 686 151 A | 8/2006 |
| JP | 57170939 A * | 10/1982 |
| JP | 2003-155384 A | 5/2003 |
| JP | 2003-192842 A | 7/2003 |
| JP | 2005-213353 A | 8/2005 |
| JP | 2005-226040 A | 8/2005 |
| WO | WO-98/50306 A1 | 11/1998 |
| WO | WO-03/002648 A1 | 1/2003 |
| WO | WO-03/002649 A1 | 1/2003 |

OTHER PUBLICATIONS

Full English-language translation of JP 57-170939 A, Oct. 21, 1982.*

* cited by examiner

*Primary Examiner* — Vickey Nerangis
(74) *Attorney, Agent, or Firm* — Birch, Stewart, Kolasch & Birch, LLP

(57) ABSTRACT

A rubber composition for a tire having improved in low fuel efficiency, wet skid performance, abrasion resistance, and steering stability with favorable balance, and tire which has tread, using the same. A rubber composition for a tire, comprising 30 to 150 parts by weight of silica having a nitrogen adsorbing-specific surface area of 20 to 200 $m^2/g$, and a pH of 7.0 to 12.0 when the silica is dispersed in water to be 5% aqueous solution, based on 100 parts by weight of a rubber component, and a tire which has a tread, using the same.

4 Claims, No Drawings

RUBBER COMPOSITION FOR A TIRE AND TIRE HAVING A TREAD USING THE SAME

BACKGROUND OF THE INVENTION

The present invention relates to a rubber composition for a tire and a tire having a tread using the same.

In recent years, properties required for tires on automobiles have become diverse including wet skid performance, abrasion resistance, and steering stability other than low fuel efficiency and in order to improve these properties, various devices have been made.

For example, a rubber composition compounded with silica in a styrene-butadiene rubber having a large amount of a styrene content (high styrene SBR) to improve various properties such as wet skid performance and steering stability at high-speed running is known. However, the rubber composition has a problem that grip performance is significantly lowered since rigidity of a rubber is lowered after repeating running. Also, since silica contains silanol groups on its surface, silica particles tend to coagulate each other, and as a result, the compound also has a problem that its processability such as extrusion becomes insufficient due to insufficient dispersion of silica particles into the rubber. In addition, a rubber composition compounded with powders of an inorganic compound together with carbon black or silica in diene rubber is also known. However, the inorganic compound powder is also difficult to disperse into a rubber as is the same as silica, and when particularly used together with silica, the rubber composition may have a problem that wet skid performance is not sufficiently improved Also, as a method to improve low fuel efficiency of a rubber composition, an example is a process of decreasing an amount of a filler, which is a reinforcing agent, however, rubber hardness is lowered, which causes a problem that steering stability and wet skid performance are deteriorated.

JP-A-2005-213353 discloses a rubber composition having improved processability, low fuel efficiency, and wet skid performance through preparing the rubber composition by a specific process, and a pneumatic tire having a tread using the same. However, effects of improving these properties are not sufficient, and a rubber composition excellent in steering stability is not disclosed.

SUMMARY OF THE INVENTION

An object of the present invention is to provide a rubber composition for a tire having improved in low fuel efficiency, wet skid performance, abrasion resistance and steering stability with a favorable balance, and a tire having a tread using the same.

The present invention relates to a rubber composition for a tire, comprising 30 to 150 parts by weight of silica having a nitrogen adsorbing-specific surface area of 20 to 200 $m^2/g$, and a pH of 7.0 to 12.0 when the silica is dispersed in water to be a 5% aqueous solution, based on 100 parts by weight of a rubber component.

It is preferable that the rubber composition for a tire comprises 1 to 30 parts by weight of an organic vulcanizing agent satisfying the general formula:

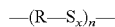

(wherein R represents $(CH_2-CH_2-O)_m-CH_2-CH_2$, x is an integer of 3 to 6, n is an integer of 10 to 400, and m is an integer of 2 to 5).

The present invention further relates to a tire, which has a tread using the rubber composition for a tire.

DETAILED DESCRIPTION

The rubber composition of the present invention comprises a rubber component and silica.

Examples of the rubber components are a natural rubber (NR), an isoprene rubber (IR), a butadiene rubber (BR), a styrene butadiene rubber (SBR), an acrylonitrile butadiene rubber (NBR), a chloroprene rubber (CR), a butyl rubber (IIR), and a styrene isoprene butadiene rubber (SIBR), and these may be used alone or in combination of at least two kinds. Among these, SBR is preferable from the viewpoint that low fuel efficiency and wet skid performance can be improved with a favorable balance.

When SBR is contained in the rubber component, an amount of SBR is preferably at least 30% by weight, and more preferably at least 40% by weight. When the amount of SBR is less than 30% by weight, wet skid performance tends to be lowered. In particular, the amount of SBR is the most preferably 100 parts by weight.

As silica used in the present invention, it is not particularly limited, but examples are dry silica (anhydrated silica) or wet silica (anhydrated silica), however, from the reasons that a larger number of silanol groups are on the surface and there are many reaction points with a silane coupling agent, the wet silica is preferable.

A nitrogen adsorbing-specific surface area ($N_2SA$) of silica is at least 20 $m^2/g$, preferably at least 30 $m^2/g$, and more preferably at least 40 $m^2/g$. When $N_2SA$ of silica is less than 20 $m^2/g$, abrasion resistance is lowered. Also, $N_2SA$ of silica is at most 200 $m^2/g$, preferably at most 150 $m^2/g$, and more preferably at most 120 $m^2/g$. When $N_2SA$ of silica exceeds 200 $m^2/g$, wet skid performance is lowered.

A pH at the time when silica is dispersed in water to be a 5% aqueous solution (5% pH) is at least 7.0, preferably at least 7.5, and more preferably at least 8.0. When the 5% pH of silica is less than 7.0, a coupling reaction with a silane coupling agent is not accelerated, thereby improvements in both low fuel efficiency and wet skid performance can not be obtained. Also, the 5% pH of silica is at most 12.0, preferably at most 11.5, and more preferably at most 11.0. When the 5% pH of silica exceeds 12.0, processability is deteriorated since scorch becomes short.

An amount of silica is at least 30 parts by weight and preferably at least 45 parts by weight based on 100 parts by weight of the rubber component. When the amount of silica is less than 30 parts by weight, sufficient improvement effects due to compounding silica is not obtained. Also, the amount of silica is at most 150 parts by weight and preferably at most 120 parts by weight. When an amount of silica exceeds 150 parts by weight, processability of the rubber composition is deteriorated due to difficulty in dispersing silica particles into a rubber.

In the present invention, low fuel efficiency is improved compared with compounding conventional silica from the reason that a coupling reaction with a silane coupling agent is effectively proceeded by compounding silica having the above-described properties.

It is preferable that a silane coupling agent is used together with silica in the rubber composition used in the present invention. The silane coupling agent favorably used in the present invention may be an arbitrary silane coupling agent conventionally used together with silica, and examples are bis(3-triethoxysilylpropyl) polysulfide, bis(2-triethoxysilylethyl) polysulfide, bis(3-trimethoxysilylpropyl) polysulfide, bis(2-trimethoxysilylethyl) polysulfide, bis(4-triethoxysilylbutyl) polysulfide, and bis(4-trimethoxysilylbutyl) polysulfide, and these may be used alone or in combination of at least two kinds, and bis(3-triethoxysilylpropyl) polysulfide is favorably used.

When a silane coupling agent and silica are used together, an amount of the coupling agent is preferably at least 2 parts by weight and more preferably at least 5 parts by weight based on 100 parts by weight of silica. When the amount of the silane coupling agent is less than 2 parts by weight, dispersion of silica tends to be deteriorated. Also, the amount of the silane coupling agent is preferably at most 20 parts by weight, and more preferably at most 15 parts by weight. When the amount of the coupling agent exceeds 20 parts by weight, it tends to cause bleed.

It is preferable that the rubber composition of the present invention further contains an organic vulcanizing agent.

The organic vulcanizing agent is a vulcanizing agent represented by the general formula:

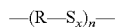

(wherein R represents $(CH_2-CH_2-O)_m-CH_2-CH_2$, x is an integer of 3 to 6, n is an integer of 10 to 400, and m is an integer of 2 to 5).

In the above formula, x is an integer of 3 to 6, and preferably an integer of 3 to 5. When x is less than 3, vulcanization is delayed. When x exceeds 6, it is difficult to prepare the rubber composition.

In the above formula, n is an integer of 10 to 400 and preferably an integer of 10 to 300. When n is less than 10, the vulcanizing agent easily evaporates and its handling becomes difficult. On the other hand when n exceeds 400, compatibility of the vulcanizing agent with the rubber is deteriorated.

In the above formula, m is an integer of 2 to 5, preferably an integer of 2 to 4, and more preferably an integer of 2 or 3. When m is less than 2, flex resistance performance is lowered. Further, when m exceeds 5, hardness of the rubber composition would become inadequate.

The amount of the organic vulcanizing agent is preferably at least 1 part by weight and more preferably at least 2 parts by weight. If the amount of the vulcanizing agent is less than 1 parts by weight, abrasion resistance tends to deteriorate. Also, the amount of the organic vulcanizing agent is preferably at most 30 parts by weight and more preferably at most 25 parts by weight. When the amount of the vulcanizing agent exceeds 30 parts by weight, hardness is excessively increased, and it tends that grip performance is not increased.

In the present invention, wet skid performance, abrasion resistance, and steering stability can be improved compared with compounding only silica having the above-described properties, while maintaining excellent low fuel efficiency, by compounding silica having the above-described properties in the rubber component, and further compounding an organic vulcanizing agent, since a crosslinking form between polymers is different, which is a S—C bond having larger bonding energy than a S—S bond, and further a bond chain is longer, and the rubber component is thermally stable due to excellent flexibility.

Besides the rubber component, silica, and an organic vulcanizing agent if necessary, the rubber composition of the present invention can contain various fillers generally used in a preparation of a rubber composition such as carbon black and clay, various antioxidants, various softeners, stearic acid, zinc oxide, and vulcanizing agents such as sulfur, and various vulcanization accelerators, if necessary.

The rubber composition of the present invention can be prepared by known processes, for example, the above-described components are kneaded using rubber kneading equipments such as a Banbury mixer and an open roll, thereafter, vulcanized to obtained the rubber composition.

The tire of the present invention is preferably a tire using the above-described rubber composition, and particularly preferably a tire having a tread, which uses the above-described composition. The tread can be prepared by, for example, a process of laminating the rubber composition formed into a sheet shape to be a specific shape, or a process of forming into two layers at the head exit of an extruder by inserting the rubber composition into the extruder having at least two screws. CL EXAMPLES The present invention is specifically explained based on Examples, however, the present invention is not only limited thereto. Styrene butadiene rubber (SBR): E15 available from Asahi Chemical Industry Co., Ltd.
Silica 1: Ultrasil 360 (wet silica, nitrogen adsorbing-specific surface area: 50 m$^2$/g, pH of 5% aqueous solution: 9.0) available from Degussa Co.
Silica 2: Ultrasil VN3 (wet silica, nitrogen adsorbing-specific surface area: 175 m$^2$/g, pH of 5% aqueous solution: 6.2) available from Degussa Co.
Silane coupling agent: Si-75 (bis(triethoxysilylpropyl) disulfide) available from Degussa Co.
Aromatic oil: Diana Process Oil AH-24 available from Idemitu Kosan Co., Ltd.
Zinc oxide: available from Mitsui Mining & Smelting Co., Ltd.
Stearic acid: Stearic acid "Tsubaki" available from NOF Corporation Antioxidant: Antigene 6C (N-(1,3-dimethylbutyl)-N'-phenyl-p-phenylenediamine) available from Sumitomo Chemical Co., Ltd.
Wax: SUNNOC N available from Ouchi Shinko Chemical Industrial Co., Ltd.
Organic vulcanizing agent: 2OS4 polymer (m=2, x=4, n=200) available from Kawaguchi Chemical Industry Co., Ltd.

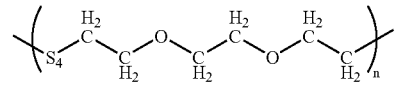

Sulfur: Available from Karuizawa Iou Co., Ltd.
Vulcanization accelerator CZ: NOCCELER CZ (N-cyclohexyl-2-benzothiazolylsulfenamide) available from Ouchi Shinko Chemical Industrial Co., Ltd.
Vulcanization accelerator DPG; NOCCELER D (diphenylguanidine) available from Ouchi Sinko Chemical Industrial Co., Ltd.

Examples 1 to 4 and Comparative Examples 1 to 6

According to the composition prescriptions shown in Tables 1 and 2, chemicals other than an organic vulcanizing agent, sulfur and a vulcanization accelerator were kneaded for 3 minutes under the condition at 150° C., using a Banbury mixer, the organic vulcanizing agent, sulfur and a vulcanization accelerator were added to the obtained kneaded product and kneaded for 3 minutes under the condition at 80° C., using a roll, and an unvulcanized rubber composition was obtained. Further, the obtained unvulcanized rubber composition was formed into a tread shape, and laminated with other tire parts, and press-vulcanized for 20 minutes under the condition at 160° C., thereby, tires for tests in Examples 1 to 4 and Comparative Examples 1 to 6 (tire size: 195/65R15) were prepared. In addition, in the above-described respective tests, in Comparative Examples 1 to 3, the basic composition was to be Comparative Example 1, and in Comparative Examples 3 and 4 and Comparative Examples 4 to 6, Comparative Example 4 was to be the basic composition.

(Rolling Resistance Property)

Using a rolling resistance tester, rolling resistance was measured when each test tire mounted on a rim of 15×6JJ was run under the conditions of an internal pressure of 230 kPa, a load of 3.43 kN, and a speed of 80 km/h, and rolling resistance of each composition was expressed as an index by the following calculation formula, assuming the rolling resistance index of the basic composition as 100. It indicates that the larger the rolling resistance index is, the smaller rolling resistance is, which is excellent in low fuel efficiency.

(Rolling resistance index)=(Rolling resistance of the basic composition)/(Rolling resistance of each composition)×100

(Wet Skid Performance)

Prepared test tires were mounded on the above-described test vehicle (domestic FF vehicle with 2000 cc engine) and actual running was carried out on a test course with an wet asphalt surface. At the actual running, the vehicle was run at a initial speed of 100 km/h, and a braking distance from breaking until stop was measured, and wet skid performance of each composition was expressed as an index by the following calculation formula, assuming the wet skid performance index of the basic composition as 100. It indicates that the larger the wet skid performance index is, the more excellent wet skid performance is.

(wet skid performance index)=(braking distance of the basic composition)/(braking distance of each composition)×100

(Abrasion Resistance)

Prepared test tires were mounded on the above-described test vehicle, the vehicle was run on a test course with an wet asphalt surface at 80 km/h, and a remaining groove value was measured after running for 30000 km. Then, an abrasion resistance index of each composition was expressed as an index by the following calculation formula, assuming the abrasion resistance index of the basic composition as 100. It indicates that the larger the abrasion resistance index is, the more excellent abrasion resistance is. In addition, the remaining groove value after running is referred to a groove depth of a tread of the mounted test tire.

(abrasion resistance index)=(remaining groove value of each composition)/(remaining groove value of the basic composition)×100

(Steering Stability)

Prepared test tires were mounded on the above-described test vehicle and actual running was carried out on a test course with an wet asphalt surface. At the actual running, evaluation of steering stability was sensorially evaluated by a test driver with the maximum 10 points, assuming steering stability of Comparative Example 4 as 6 points. It indicates that the larger the steering stability index is, the more favorable steering stability is.

Results of the above-described evaluations are shown in Tables 1 and 2.

TABLE 1

|  | Ex. | | Com. Ex. | | |
| --- | --- | --- | --- | --- | --- |
|  | 1 | 2 | 1 | 2 | 3 |
| Amounts (part by weight) | | | | | |
| SBR | 100 | 100 | 100 | 100 | 100 |
| Silica 1 | 60 | 80 | — | 20 | 160 |
| Silica 2 | — | — | 60 | — | — |
| Silane coupling agent | 4.8 | 6.4 | 4.8 | 1.6 | 12.8 |

TABLE 1-continued

|  | Ex. | | Com. Ex. | | |
| --- | --- | --- | --- | --- | --- |
|  | 1 | 2 | 1 | 2 | 3 |
| Aromatic oil | 8 | 8 | 8 | 8 | 8 |
| Zinc oxide | 3 | 3 | 3 | 3 | 3 |
| Stearic acid | 2 | 2 | 2 | 2 | 2 |
| Antioxidant | 2 | 2 | 2 | 2 | 2 |
| Wax | 2 | 2 | 2 | 2 | 2 |
| Sulfur | 1.5 | 1.5 | 1.5 | 1.5 | 1.5 |
| Vulcanization accelerator CZ | 1.3 | 1.3 | 1.3 | 1.3 | 1.3 |
| Vulcanization accelerator DPG | 0.5 | 0.5 | 0.5 | 0.5 | 0.5 |
| Evaluation results | | | | | |
| Rolling resistance index | 105 | 102 | 100 | 102 | 97 |
| Wet skid performance index | 100 | 101 | 100 | 98 | 104 |
| Steering stability index | 6 | 6.5 | 6 | 5 | 6.5 |

TABLE 2

|  | Ex. | | Com. Ex. | | |
| --- | --- | --- | --- | --- | --- |
|  | 3 | 4 | 4 | 5 | 6 |
| Amounts (part by weight) | | | | | |
| SBR | 100 | 100 | 100 | 100 | 100 |
| Silica 1 | 60 | 60 | — | 60 | 60 |
| Silica 2 | — | — | 60 | — | — |
| Silane coupling agent | 4.8 | 4.8 | 4.8 | 4.8 | 4.8 |
| Aromatic oil | 8 | 8 | 8 | 8 | 8 |
| Zinc oxide | 3 | 3 | 3 | 3 | 3 |
| Stearic acid | 2 | 2 | 2 | 2 | 2 |
| Antioxidant | 2 | 2 | 2 | 2 | 2 |
| Wax | 2 | 2 | 2 | 2 | 2 |
| Organic vulcanizing agent | 1 | 5 | — | 0.5 | 35 |
| Sulfur | 1 | — | 1.5 | — | — |
| Vulcanization accelerator CZ | 1.3 | 1.3 | 1.3 | 1.3 | 1.3 |
| Vulcanization accelerator DPG | 0.5 | 0.5 | 0.5 | 0.5 | 0.5 |
| Evaluation results | | | | | |
| Rolling resistance index | 102 | 103 | 100 | 102 | 104 |
| Wet skid performance index | 101 | 102 | 100 | 100 | 98 |
| Abrasion resistance index | 103 | 105 | 100 | 98 | 106 |
| Steering stability index | 6 | 6.5 | 6 | 5 | 6.5 |

According to the present invention, a rubber composition for a tire having improved in low fuel efficiency, while maintaining wet skid performance and steering stability, by compounding a predetermined amount of specific silica in a rubber component, and a tire having a tread using the same can be provided. In particular, by compounding a predetermined amount of a specific organic vulcanizing agent as a vulcanizing agent, wet skid performance, abrasion resistance, and steering stability can be improved with a favorable balance while maintaining excellent low fuel efficiency.

What is claimed is:

1. A tire having a tread formed from a rubber composition for a tire comprising:
    30 to 150 parts by weight of silica having a nitrogen adsorbing-specific surface area of 20 to 200 m²/g and a pH of 7.0 to 12.0 when the silica is dispersed in water to be a 5% aqueous solution; and
    1 to 5 parts by weight of an organic vulcanizing agent satisfying the general formula:

—(R—S$_x$)$_n$— wherein R represents (CH$_2$—CH$_2$—O)$_m$—CH$_2$—CH$_2$, x is an integer of 3 to 6, n is an integer of 200, and m is an integer of 2 to 3, based on 100 parts by weight of a rubber component, wherein the rubber component is 100% by weight of a styrene butadiene rubber.

2. The tire having a tread of claim 1, further comprising 2 to 20 parts by weight of a silane coupling agent based on 100 parts by weight of the silica.

3. The tire having a tread of claim 2, wherein a nitrogen adsorbing-specific surface area of the silica is 20 to 120 m$^2$/g.

4. The tire having a tread of claim 1, wherein the amount of the silica is 45 to 120 parts by weight based on 100 parts by weight of the rubber component.

* * * * *